(12) United States Patent
Dahm

(10) Patent No.: US 10,788,213 B2
(45) Date of Patent: Sep. 29, 2020

(54) RAYLEIGH-TAYLOR ASSISTED COMBUSTION WITH MICRO-FLAMEHOLDERS

(71) Applicant: ARIZONA BOARD OF REGENTS ON BEHALF OF ARIZONA STATE UNIVERSITY, Scottsdale, AZ (US)

(72) Inventor: Werner Dahm, Scottsdale, AZ (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 359 days.

(21) Appl. No.: 15/754,540

(22) PCT Filed: Aug. 4, 2016

(86) PCT No.: PCT/US2016/045502
§ 371 (c)(1),
(2) Date: Feb. 22, 2018

(87) PCT Pub. No.: WO2017/052795
PCT Pub. Date: Mar. 30, 2017

(65) Prior Publication Data
US 2019/0024898 A1 Jan. 24, 2019

Related U.S. Application Data

(60) Provisional application No. 62/210,691, filed on Aug. 27, 2015.

(51) Int. Cl.
*F23R 3/18* (2006.01)
*F02C 9/40* (2006.01)
(Continued)

(52) U.S. Cl.
CPC ............ *F23R 3/18* (2013.01); *F02C 7/22* (2013.01); *F02C 9/40* (2013.01); *F23R 3/56* (2013.01)

(58) Field of Classification Search
None
See application file for complete search history.

(56) References Cited

U.S. PATENT DOCUMENTS 4,244,349 A 1/1981 Velie et al.
7,685,824 B2 3/2010 Dahm
(Continued)

FOREIGN PATENT DOCUMENTS

WO 2011031983 3/2011
WO 2012-171094 A1 12/2012

OTHER PUBLICATIONS

The International Search Report and Written Opinion for PCT International Patent Application No. PCT/US2016/045502 dated May 15, 2017.

*Primary Examiner* — Steven M Sutherland
*Assistant Examiner* — Rodolphe Andre Chabreyrie
(74) *Attorney, Agent, or Firm* — Quarles & Brady LLP

(57) ABSTRACT

Embodiments of the invention provide a system or a method for combusting reactants including a fuel and an oxidizer into combustion products in a combustor. A combustor can be configured to contain a flow of the reactants and the combustion products that extends in a first direction. The flow can be subject to acceleration in a second direction at least partly transverse to the first direction. One or more micro-flameholders can be disposed within the combustor at or upstream of a location at which the flow is subject to the acceleration in the second direction. The one or more micro-flameholders can be configured to facilitate or promote Rayleigh-Taylor instability to cause interpenetration of the reactants and the combustion products within the combustor.

19 Claims, 6 Drawing Sheets

(51) Int. Cl.
*F02C 7/22* (2006.01)
*F23R 3/56* (2006.01)

(56) References Cited

U.S. PATENT DOCUMENTS

| | | | |
|---|---|---|---|
| 8,371,101 B2 | 2/2013 | Zuo | |
| 8,484,980 B1 * | 7/2013 | Trefny | F02K 7/10 |
| | | | 60/767 |
| 8,881,500 B2 * | 11/2014 | Gutmark | F23C 15/00 |
| | | | 60/247 |
| 9,097,183 B2 | 8/2015 | Dahm | |
| 2005/0126755 A1 | 6/2005 | Berry et al. | |
| 2007/0237693 A1 | 10/2007 | Burd et al. | |
| 2010/0288379 A1 * | 11/2010 | Dahm | B64C 21/10 |
| | | | 137/561 R |
| 2011/0167789 A1 * | 7/2011 | Dahm | F02C 3/14 |
| | | | 60/214 |
| 2014/0290259 A1 * | 10/2014 | Plante | F02C 3/165 |
| | | | 60/767 |

* cited by examiner

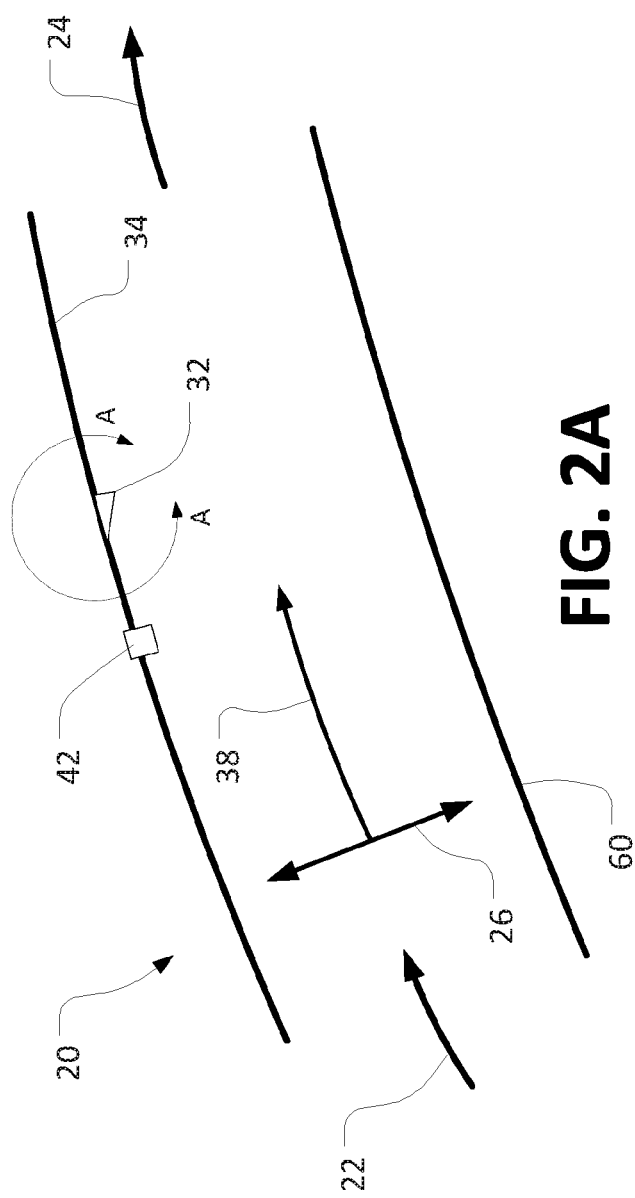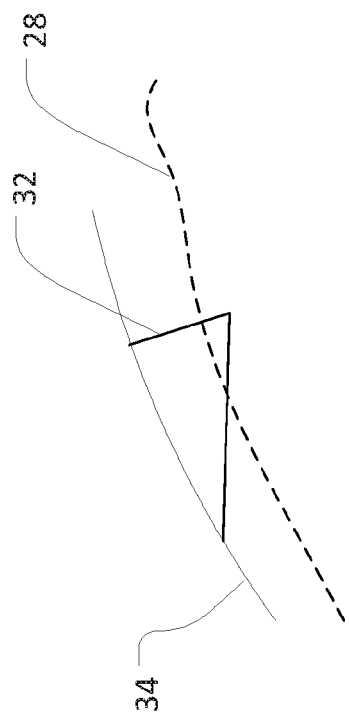

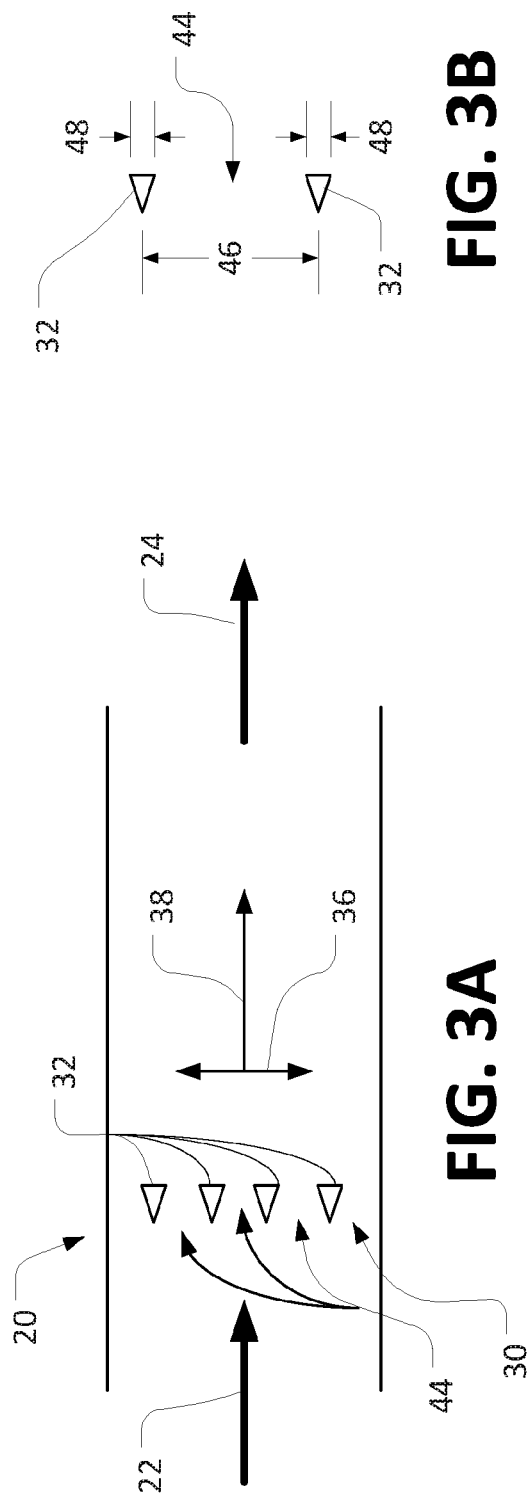
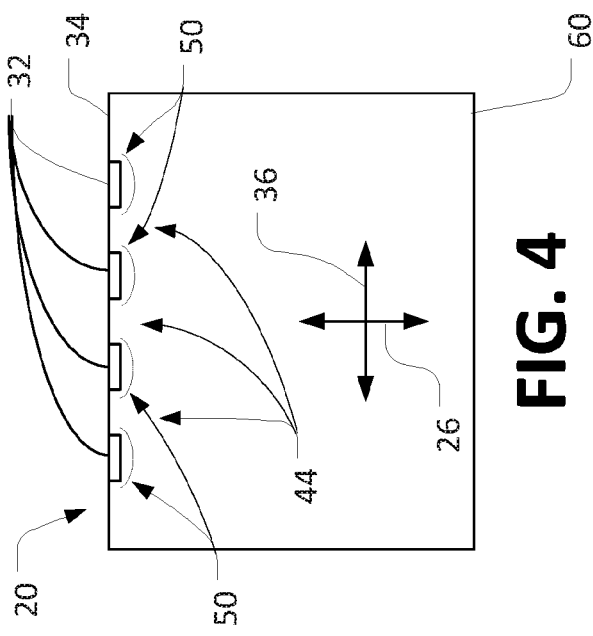
FIG. 3A
FIG. 3B
FIG. 4

US 10,788,213 B2

RAYLEIGH-TAYLOR ASSISTED COMBUSTION WITH MICRO-FLAMEHOLDERS

CROSS-REFERENCE TO RELATED APPLICATIONS

This patent application claims priority to International Patent Application No. PCT/US2016/045502, titled "Rayleigh-Taylor Assisted Combustion with Micro-Flameholders" and filed on Aug. 4, 2016, which claims priority to U.S. provisional application No. 62/210,691, titled "Rayleigh-Taylor Assisted Combustion with Micro-Flameholders" and filed on Aug. 27, 2015, the contents of both which are incorporated herein by reference.

BACKGROUND

Conventional gas turbine engines, conventional ramjet engines, rotary ramjet engines, and other engines that operate on the internal combustion principle have one or more combustors for combusting reactants (e.g., mixtures of fuel and compressed air) into combustion products (e.g., product gases). During operation of conventional continuous-combustion engines, combustion can be commenced in the combustors, with a relatively continual flow of reactants into the combustors and the resultant mixing of the reactants with combustion products generally maintaining continual combustion in the relevant combustor. During operation of conventional intermittent-combustion engines, combustion can be commenced in the combustors with a relatively intermittent flow of reactants into the combustors and associated mixing of the reactants with combustion products to establish desirable conditions for combustion in the relevant chamber.

SUMMARY

Some embodiments of the invention include a method for combusting reactants including a fuel and an oxidizer (e.g., as combined in a reactant mixture) into combustion products in a combustor. An engine can be provided with a combustor configured to contain a flow of the reactants and the combustion products that extends in a first direction. The flow can be subject to acceleration in a second direction at least partly transverse to the first direction. One or more micro-flameholders can be disposed within the combustor at or upstream of one or more locations at which the flow is subject to the acceleration in the second direction. The one or more micro-flameholders can be configured to facilitate or promote Rayleigh-Taylor instability in order to cause interpenetration of the reactants and the combustion products within the combustor.

Other embodiments of the invention include a system for combusting reactants including a fuel and an oxidizer into combustion products in a combustor. A combustor can be configured to contain a flow of the reactants and the combustion products that extends in a first direction. The flow can be subject to acceleration in a second direction at least partly transverse to the first direction. One or more micro-flameholders can be disposed within the combustor at or upstream of one or more locations at which the flow is subject to the acceleration in the second direction. The one or more micro-flameholders can be configured to facilitate or promote Rayleigh-Taylor instability and RT-driven interpenetration and mixing in order to cause interpenetration of the reactants and the combustion products within the combustor.

Other embodiments of the invention include a system for combusting reactants including a fuel and an oxidizer into combustion products in a combustor of an engine that operates on an intermittent-combustion principle. A combustor can be configured to contain the reactants and the combustion products such that the combustor moves in a first direction. The reactants and the combustion products can be arranged to flow within the moving combustor. The motion of the combustor can induce acceleration in a second direction at least partly transverse to the first direction. One or more micro-flameholders can be disposed within the combustor at or upstream of one or more locations at which the flow of the reactants and the combustion products is subject to the acceleration in the second direction. The one or more micro-flameholders can be configured to facilitate or promote Rayleigh-Taylor instability and RT-driven interpenetration and mixing in order to cause interpenetration of the reactants and the combustion products within the moving combustor.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 2A is a sectional schematic view of a portion of the combustor of FIG. 1A, including one of the micro-flameholders, taken along a plane in parallel with a streamwise flow direction of the combustor of FIG. 1A;

FIG. 2B is an enlarged sectional schematic view of a region A-A of FIG. 2A;

FIG. 3A is another sectional schematic view of another portion of the combustor of FIG. 1A, including the micro-flameholders, taken along another plane in parallel with the streamwise flow direction of the combustor of FIG. 1A;

FIG. 3B is a schematic view of two of the micro-flameholders of FIG. 1A, taken from the same perspective as in FIG. 3A, showing certain dimensions of the micro-flameholders and a spacing therebetween;

FIG. 4 is a sectional schematic view of the combustor of FIG. 1A, including the micro-flameholders, taken from downstream of the micro-flameholders along a plane perpendicular to the streamwise flow direction of the combustor of FIG. 1A.

DETAILED DESCRIPTION

Figure 1A:
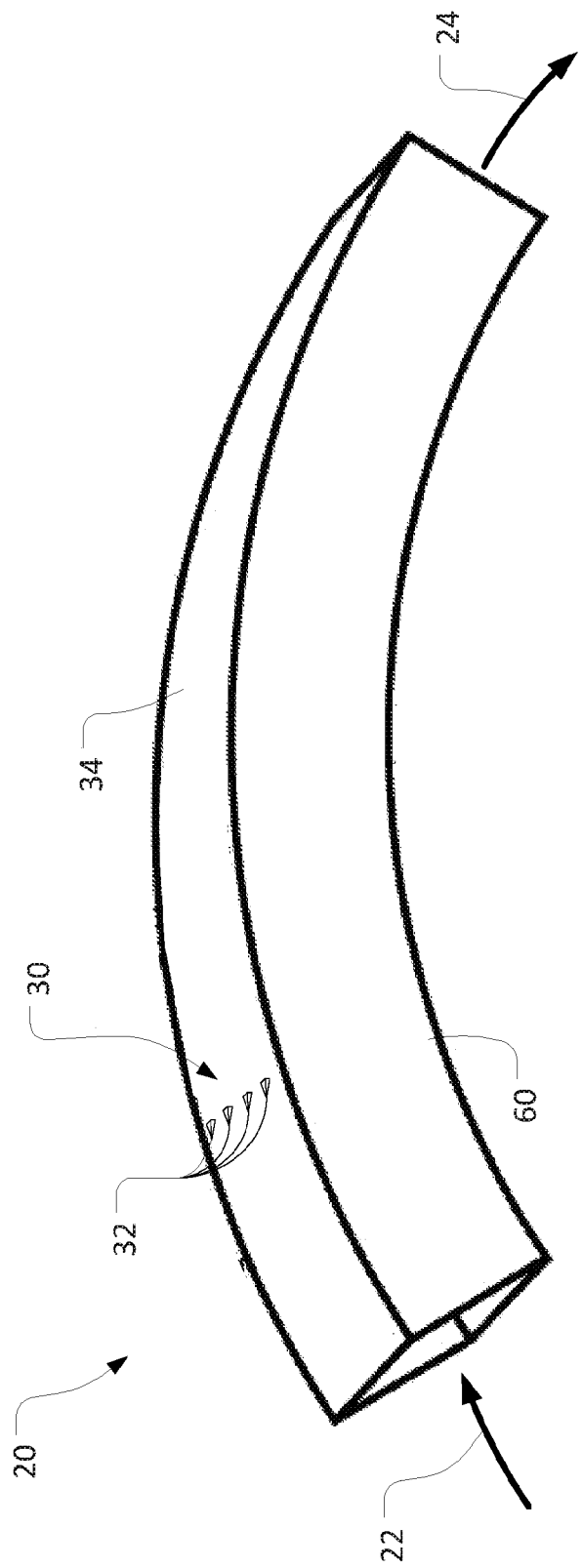
FIG. 1A is a front perspective schematic view of a combustor with micro-flameholders, according to one embodiment of the disclosure.

Before any embodiments of the invention are explained in detail, it is to be understood that the invention is not limited in its application to the details of construction and the arrangement of components or operations set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Likewise, "at least one of A, B, and C," "one or more of A, B, and C," and the like, is meant to indicate A, or B, or C, or any combination of A, B, and/or C. Where A, B, or C denote plural elements, "at least one of A, B, and C" and the like "one or more of A, B, and C," and the like, can indicate one or more of the elements A, one or more of the elements B, one or more of the elements C, or any combination of one or more the elements A, one or more of the elements B, and/or one or more of the elements C.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

In various engines, although combustion products may no longer be combustible, it can be important for the combustion products to be present in the combustor. For example, appropriately extensive interpenetration and mixing between relatively hot combustion products and relatively cool reactants within the combustor can be important in order to maintain continual combustion in the combustor and to ensure that an appropriate (e.g., maximal) amount of reactants is burned before exiting the combustor. Accordingly, achieving proper interpenetration and associated mixing between the product gases and the reactants within the combustor can be an important consideration for effective and efficient combustor design.

Proper interpenetration and mixing can also bear on the maintaining of flameholding over a wide range of combustor flow rates, as well as the achieving of expanded fuel-lean blowout limits and high combustion efficiency. For example, when fuel and oxidizer (e.g., air) are introduced separately into the combustor, failure to provide for adequate fuel-air mixing can lead to poor combustion efficiency, flame instability, and even to complete loss of flameholding needed to maintain the combustion (sometimes referred to as "flameout"). Similarly, when fuel and oxidizer are premixed before entering the combustor, poor mixing of combustion products with the reactants entering the combustor can lead to poor flameholding characteristics, restrictive blowout limits (including under fuel-lean conditions), and low combustion efficiency.

Some conventional combustors operate under nominal-gravity conditions, with the result that buoyancy forces resulting from gravity and the density differences between cold reactants and hot combustion products can be the sole natural means to drive the mixing that can support effective combustion performance. Such buoyancy-mixing resulting from normal-gravity conditions may produce undesirably or unacceptably low rates of mixing, and thereby may fail to achieve desired rates of combustion. For some installations, it may therefore be appropriate to consider alternatives to such natural buoyancy-driven mixing under normal-gravity conditions.

As such, some conventional combustors instead (or additionally) rely on aerodynamically-driven mixing of cold reactants with hot combustion products to improve various aspects of combustion performance, using any of a variety of macro-scale, separated-flow flameholders such as steps, ramps, cavities, vanes, vortex generators, bluff bodies, or similar geometries. Generally, such flameholders can be designed to produce flow separation from sharp corners, which in turn can create local recirculation zones in which hot combustion products are continually mixed with incoming cold reactants to maintain ignition of the combustion process. Such macro-scale flameholders can also be designed to produce large vortices or other aerodynamic features in the downstream flow of reactants and products within the combustor, in order to provide greater interpenetration and associated mixing between the product gases and the reactants and thereby promote higher combustion efficiency.

In many applications, aerodynamically-driven mixing can provide better combustion performance than natural buoyancy-driven mixing (e.g., as described above). However, relatively high rates of dissipation in the turbulent recirculation zones produced by large aerodynamic flameholders can create substantial system-level performance penalties. For example, large total pressure losses from movement of fluids past the flameholders can reduce the thermodynamic efficiency of the resulting combustion system. Similarly, the large vortices or other aerodynamic features produced in the downstream flow within the combustor by such macro-scale flameholders can create additional total pressure losses that further reduce the thermodynamic efficiency.

Various efforts have been made with regard to conventional combustors in order to alleviate conditions that can result in flameout, reduced thermodynamic efficiencies, or other issues. For conventional gas turbine engines and conventional ramjet engines, for example, some efforts have focused on aerodynamic stabilization through geometric design of diffusers and combustors, in order to control the flow pattern of the reactants and the product gases within the combustor. In aerodynamic stabilization designs, for example, the internal geometry of a combustor and various parts therein can be configured such that inertia of the reactants entering the combustor assists with interpenetration of the reactants and product gases within the combustor. However, in many conventional engines, such as conventional gas turbines, such aerodynamic stabilization methods can ensure continuous and efficient combustion over only a limited range of reactant flow rates and relative fuel-to-air mass ratios.

Moreover, in some types of engines, such as rotary ramjet engines, aerodynamic stabilization methods capable of providing acceptable thermodynamic efficiencies may be generally insufficient for stabilizing combustion to avoid flameout over a useful range of design or operating conditions. In rotary ramjet engines, for example, the reactants and combustion products in the combustors can be subjected to large accelerations as a consequence of the rotating nature of the combustors. With conventional designs, the effects of this acceleration on the flow of the reactants and combustion products can adversely affect interpenetration patterns of the reactants and combustion products within the combustor and thereby fail to provide acceptable thermodynamic efficiency, combustion efficiency, and appropriately stable combustion.

Even in intermittent-combustion engines, such as certain types of rotary internal combustion engines, it is often desirable to achieve increased rates of interpenetration and mixing of the reactants (e.g., as combined in a reactant mixture) and combustion products within the combustors. Such mixing can provide benefits in terms of combustion efficiency, thermodynamic efficiency, and other desirable properties of an engine. However in some rotating intermittent-combustion engines with conventional designs, large accelerations may act on the reactants (e.g., as combined in a reactant mixture) and combustion products, which may adversely affect interpenetration and mixing within the combustor and thereby adversely impact overall engine performance.

A system and method is provided herein for improving interpenetration, mixing, and combustion between reactants including a fuel and an oxidizer and associated combustion products (e.g., gases) in various combustors. In some embodiments, the disclosed system and method can be useful in engines having one or more combustors in which the reactants and the product gases are subjected to acceleration that is directed at least partly (e.g., fully) transverse to a direction along which the reactants flow through the combustors. For example, the disclosed system can include (and the disclosed method can include providing) combustors with at least partly curvilinear flow paths for reactants and combustion products, such that the reactants and combustion products can be subjected to at least partly centripetal acceleration as they move along the flow paths.

Some discussion herein encompasses example combustors in which reactants (e.g., fuel and oxidizer) are premixed before entering the combustors. Generally, embodiments of the disclosed system and method can be used in these types of combustors, as well as in combustors for which reactants (e.g., fuel and oxidizer) are not premixed (e.g., are separately injected into the combustor). Accordingly, unless otherwise limited, any discussion herein of systems with premixed reactants is presented only to provide examples of one possible configuration.

In some embodiments, the disclosed system and method can be useful in engines in which a combustor (or a portion thereof) rotates during operation, such that the reactants and the combustion products are subjected to at least partly centripetal acceleration by the rotation of the combustor. For example, embodiments of the disclosed system and method can be used in "high-g" systems, such as rotary ramjets and other rotating combustion systems, as well as in wave rotors and with other similar configurations in which the cold reactants and hot combustion products mix and react under high-g conditions. In some rotating combustors, centripetal accelerations can be induced to reach 1,000,000 g's or higher.

In some embodiments, even combustors that do not rotate (or do not rotate at particularly high speeds) can be configured to induce high-g conditions, which can be exploited under the principles of this disclosure. For example, as also noted above, the combustion flow path of an engine can be arranged to follow a partially circular geometry or other curvilinear geometry that induces centripetal acceleration on the reactants and products flowing through the combustor. In a simple circular combustor geometry, for example, it may be practical to induce centripetal accelerations in excess of 10,000 g's.

In an appropriately high-g combustor flow path (e.g., in rotating, curved, or other combustors), the large centripetal acceleration can induce large forces on the reactants and products in the combustor. For example, such a combustor flow path can create substantially large induced buoyancy forces on the gases within it, due to the centripetal acceleration and the density differences between cold reactants and hot combustion products. The resulting induced buoyancy forces can easily be 10,000 to 1,000,000 times larger than the natural buoyancy forces that would occur due to gravity alone. These large induced buoyancy forces can be advantageously used under the principles of this disclosure, to reduce or even eliminate the traditional aerodynamic flameholding approach and the performance penalties associated with it. In some embodiments, flameholders may be introduced in a combustor as taught herein to achieve improved interpenetration and mixing within the combustor through advantageous use of the large induced buoyancy forces, to further exploit performance benefits made available by such interpenetration and mixing.

In some embodiments, one or more micro-flameholders can be disposed within the combustor in order to facilitate or promote what is known as Rayleigh-Taylor ("RT") instability with regard to the reactants and the combustion products. Generally, RT instability can occur at an interface between two fluids of different densities when the gradients of the fields of density and pressure have vector components that point in opposite directions along a line oriented perpendicular to the interface. The gradient in the field of density points in the direction of increasing density, and thus generally points from the lower density combustion products toward the more dense reactants (e.g., as combined in a reactant mixture). The gradient in the field of pressure points in the direction of increasing pressure, and thus, for example, in a curvilinear combustor, points in the direction of the radially outward centrifugal force imposed by the radially inward transverse (centripetal) acceleration acting on the reactants and the combustion products in the combustor. When the vector components of the density gradient and pressure gradient point in opposing directions along a line oriented perpendicular to the interface, irregularities in the interface between the two fluids can be amplified by the transverse acceleration, thereby creating interpenetrating RT "fingers." Such RT fingers of denser fluid and less dense fluid interpenetrating one another can greatly increase the mixing and combustion rates occurring within the device. Interactions between the resulting adjacent interpenetrating RT fingers then furthermore promote RT-driven turbulence that can additionally increase interpenetration, mixing, and combustion within the device.

Accordingly, RT instability and the resulting RT-driven turbulence can help to greatly enhance mixing and combustion within a combustor in which a transverse acceleration acts on the reactants and the combustion products as the reactants and the combustion products flow along the combustor. Generally, due at least to temperature differences, combustion products in a combustor tend to be less dense than reactants and can therefore be subject to formation of RT instability. Therefore, disposing micro-flameholders appropriately within a combustor can facilitate or promote RT instability between the denser reactants and less dense combustion products in order to facilitate or promote (e.g., generally enhancing) interpenetration, mixing, and combustion of reactants and combustion products within the combustor. Among other benefits, the resulting facilitated or promoted (e.g., generally enhanced) interpenetration, mixing, and combustion can lead to improved flameholding performance of the combustor, expanded blowout limits of the combustor, improved combustion efficiency of the combustor, faster combustion times, and improved thermodynamic efficiency of the combustor.

Moreover, the ability to achieve these benefits through the use of micro-flameholders appropriately disposed to facilitate or promote formation of RT instability can reduce or even eliminate the need for macro-scale flameholders used in conventional combustor designs, and thereby can reduce or eliminate the thermodynamic efficiency penalties associated with conventional macro-scale flameholders. For example, because micro-flameholders are significantly smaller than the conventional macro-scale flameholders, they can create relatively smaller total pressure losses, or even negligible total pressure losses, in comparison with macro-scale flameholders.

To this end, in some embodiments, one or more micro-flameholders can be disposed within a combustor so as to at least partly trap lower-density combustion products in the immediate (e.g., downstream) proximity of the micro-flameholders. Where the reactants and products are subject to transverse acceleration (e.g., due to curvilinear flow paths or rotating combustors), this can accordingly facilitate or enhance RT instability and RT-driven turbulence between the reactants and products and provide significantly improved interpenetration, mixing, combustion, and flameholding with lower total pressure losses. In this regard, it may be possible to dispose one or more micro-flameholders upstream of an area of a combustor that is subject to transverse acceleration, with the region of trapped combustion products extending into the area subject to the transverse acceleration, as an alternative (or in addition) to disposing the micro-flameholders directly within the acceleration area.

In contrast to conventional macro-scale flame-holders, micro-flameholders may not necessarily rely on large-scale separated-flow aerodynamics created by the flameholders themselves to mix combustion products with the incoming reactants. Instead, as noted above, the one or more micro-flameholders can be arranged so as to facilitate or promote RT instability between the trapped, less-dense combustion products and the denser, incoming reactants. With such an arrangement, the resulting RT instability and RT-driven turbulence can be a primary mechanism for mixing combustion products with the incoming reactants. Accordingly, in accordance with this disclosure, the one or more micro-flameholders can be formed with significantly smaller dimensions than conventional large-scale flameholders, while still ensuring appropriate mixing of reactants and combustion products. For example, each micro-flameholder may need to trap only a relatively small amount of lower-density hot combustion products behind the micro-flameholder, such that the trapped combustion products can serve as a continuous ignition source (e.g., similar to a pilot light) for incoming higher-density relatively cool reactants.

Micro-flameholders (and micro-flameholder arrays) according to this disclosure can include a variety of geometries. In some embodiments, for example, the micro-flameholders can be configured as geometrically scaled-down versions of conventional large-scale flameholders (e.g., ramps, vanes, bluff-bodies, steps, cavities, and so on). In general any geometric shape or feature that can serve the function of flameholding at large scales can be scaled down to serve as a micro-flameholder in the present invention, so long as in its scaled down form it still serves the function of flameholding. The present invention teaches the configuration of one or more of such micro-flameholders in a manner to facilitate or promote Rayleigh-Taylor instability and thereby enhance interpenetration of the reactants and combustion products in the combustor.

In some embodiments, micro-flameholders can be disposed on a wall of the combustor that is locally perpendicular to the direction of the transverse acceleration (e.g., a radially outer (but internal) wall of an annular combustor or a radially outer (but internal) wall of a curvilinear flow channel), such that the transverse acceleration acts to force the less dense combustion products formed in the immediate proximity of the micro-flameholders to flow away from the micro-flameholders in a direction at least partly transverse to the local, bulk reactant/product flow path. At the same time, the acceleration can also force the denser reactants to flow toward the micro-flameholders and into separations between adjacent micro-flameholders in a direction at least partly transverse to the local, bulk reactant/product flow path.

Figure 1B:
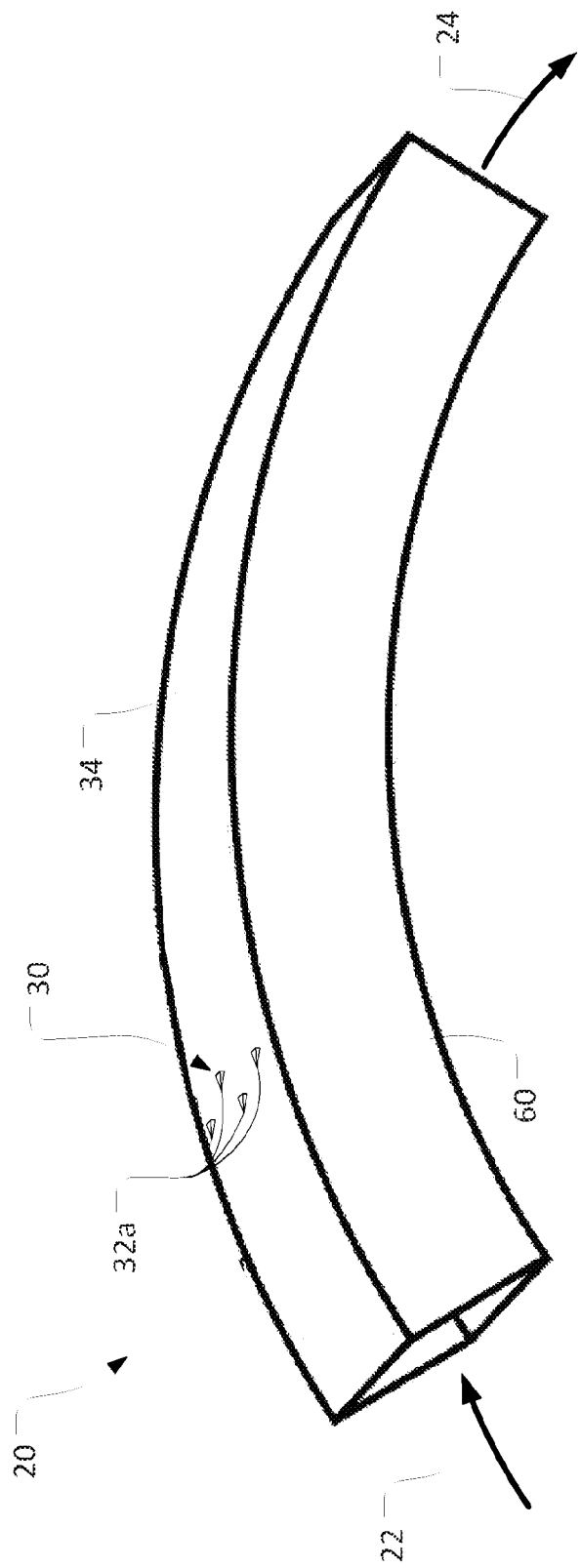
FIG. 1B is a front perspective schematic view of the combustor of FIG. 1A with a non-collinear arrangement of micro-flameholders, according to another embodiment of the disclosure.

In some embodiments, micro-flameholders can be disposed in a collinear manner on a wall, as illustrated in FIG. 1A, while in other embodiments micro-flameholders can be disposed in any of various non-collinear configurations on a wall. Such non-collinear configurations can include staggered configurations, as illustrated in FIG. 1B, slanted configurations, as illustrated FIG. 1C, and any other collinear or non-collinear configurations that promote or enhance RT instability within the combustor.

In some embodiments, micro-flameholders can be disposed to provide separation between adjacent micro-flameholders along a lateral direction that is generally perpendicular to the streamwise direction of the local bulk flow, and also generally perpendicular to the direction with which acceleration acts on the gases flowing through the combustor (e.g., the transverse direction of a centripetal acceleration). In some embodiments, each micro-flameholder in an array can be separated with the same (or similar) spacing from the relevant neighboring micro-flameholders. In some embodiments, spacing between different micro-flameholders can vary. In some embodiments, the separation between micro-flameholders can be on the order of or larger than the maximum lateral width of the micro-flameholders.

Generally, one or more micro-flameholders can be disposed at any number of locations in a combustor, so long as the disposition of (and any separation between) the micro-flameholders acts to promote or enhance RT instability and RT-driven turbulence within the combustor. In some embodiments, an array of micro-flameholders can be provided. Such an array, for example, can include a single row of micro-flameholders, such as a single row of micro-flameholders extending along a direction that is perpendicular to both the local bulk flow path and the local transverse (e.g., centripetal) acceleration. In some embodiments, other configurations are possible, including two-dimensional arrays of micro-flameholders. In some embodiments, it may be possible to use only a single micro-flameholder to exploit at least some of the benefits of RT-enhanced mixing and combustion.

Reactants flowing over the micro-flameholders can be first ignited by any of a number of means, such as a single-spark igniter or other element, such that each micro-flameholder can naturally begin to trap the resulting combustion products in its immediate downstream proximity. Generally, however, once this process has begun, an igniter may no longer be necessary, as the trapped combustion products themselves can ignite the incoming reactants.

As the denser reactants flow over the less dense combustion products trapped behind each appropriately disposed micro-flameholder, RT instability is generally initiated between the reactants and products. With appropriate placement of the one or more micro-flameholders, a lateral (or other) pattern of irregularities in the initial interface between the product gases and the reactants can be created. This pattern can then be amplified by way of the RT instability to provide relatively rapid interpenetration and associated mixing between the combustion products and the reactants within the combustor.

Generally, the center-to-center (or other) lateral spacing between adjacent micro-flameholders in an array of micro-flameholders, denoted by "S," can define a dominant wavelength, "λ," in the pattern of irregularities in the interface between the product gases and the reactants. In general, therefore, as discussed herein, λ can be viewed as substantially equal to S.

In keeping with the principles of this disclosure, it can be useful to select the dominant wavelength, λ, (and, accordingly, a spacing, S) to be sufficiently close a most-amplified RT wavelength for a particular system. Such a most-amplified wavelength can be determined, for example, based upon a density, "ρ1," of the reactants, a density, "ρ2," of the product gases, a transverse acceleration, "A," acting on the reactants and combustion products within the combustor, and a thickness, "δ," of the interface between the higher-density reactants and the lower-density product gases. The thickness "δ" of the interface can be calculated as "δ=SQRT{D×T}", where "D" is the diffusivity of the reactants into combustion products and "T" is the time it takes for the reactants to travel the length of the zone of trapped combustion products downstream of each micro-flameholder.

Generally, for any wavelength, λ, that is substantially larger than the interface thickness, δ, a resulting RT amplification rate "β" can be determined as "β=SQRT{2·π·α·A/λ}", where "α=(ρ1−ρ2)/(ρ1+ρ2)" is a dimensionless density difference ratio. The effect of the dominant wavelength, λ, on the RT amplification rate, β, shows that decreasing the dominant wavelength, λ, by reducing the lateral center-to-center spacing, S, of the micro-flameholders can generally lead to a larger RT amplification rate, β, which can be desirable for achieving rapid interpenetration of the product gases into the reactants.

The above-noted beneficial effect of reducing the spacing, S, can remain effective until the corresponding dominant wavelength becomes of the same order of magnitude as the interface thickness, δ. However, for wavelengths, λ, that are substantially shorter than δ, the effect of thermal and mass diffusion between the reactants and the product gases can cause a decrease in the amplification rate, β, with continued reduction in the wavelength, λ. Thus, in some embodiments, there may be an optimal dominant wavelength, λ, of the order of δ, at which the RT amplification rate, β, will be maximized, and thus at which the interpenetration of the reactants and the product gases within the combustor will be greatest. Accordingly, there may be a corresponding optimal spacing, S, of the micro-flameholders at which the amplification rate, β, is maximized, along with various of the beneficial effects of the disclosed system and method.

In some embodiments, it may not be practical (or otherwise desirable) to reduce the spacing "S" of the micro-flameholders to correspond to the maximally amplified wavelength for RT instability. Significant amplification rates, β, can nevertheless be achieved with lateral spacings, S, between micro-flameholders corresponding to dominant wavelengths, λ, that are substantially different from this optimal value. Generally, wavelengths, λ, that are longer than the optimal value may be preferable to those that are shorter than the optimal value, due to the manner in which the RT amplification rate, β, varies with the wavelength, λ. However, a variety of lateral spacings, S, between the micro-flameholders may provide beneficial RT amplification of the resulting lateral pattern of irregularities in the interface between the product gases and the reactants, with attendant benefits to combustion performance.

When the lateral spacing, S, is approximately equal to the interface thickness, δ, the resulting RT amplification rate will be approximately "β=SQRT{2·π·α·A/δ}." When the lateral center-to-center spacing, S, is substantially larger (or smaller) than the interface thickness "δ", the resulting RT amplification rate will be approximately "β=SQRT{2·π·α·A/S}." Thus spacing of the micro-flameholders may not necessarily be strictly dictated based upon maximizing the RT amplification rate, β, and thereby maximizing effectiveness of interpenetration and mixing attributable to fingering instabilities, and the micro-flameholders may be disposed in the combustor in any manner that results in creation of RT instability.

FIG. 1A illustrates an example combustor 20 according to one embodiment of the disclosure. As depicted, the combustor 20 includes a generally curvilinear profile, such that combustion products and reactants (e.g., as combined in a reactant mixture) flowing through the combustor 20 (e.g., flowing into the combustor 20 at inlet 22 and out of the combustor 20 at outlet 24) may be subject to a transverse (e.g., generally centripetal) acceleration. The general direction of such an acceleration can be seen in FIG. 2A, for example, as indicated by transverse direction 26, with the centripetal acceleration being generally directed downward along the direction 26, as illustrated. In the embodiment depicted, the transverse acceleration can result simply from the curvilinear flow path provided by the combustor 20, with the combustor 20 itself being rotationally stationary. In some embodiments, as also noted above, similarly useful acceleration can be alternatively (or additionally) provided by rotation of a combustor (e.g., of the combustor 20).

In order to generate enhanced RT instability and the resultant mixing of combustion products and reactants, an array 30 of micro-flameholders 32 can be disposed along a flow path of the combustor 20. As depicted, the array 30 includes four micro-flameholders 32 arranged in a one-dimensional array extending laterally across a radially outer (internal) wall 34 of the combustor 20 (e.g., in a lateral direction 36 generally perpendicular to the bulk, local flow direction 38, as illustrated in FIG. 3A). In other embodiments, other configurations can be used, including for example a single micro-flameholder, such as a micro-step (not shown). In some embodiments, such a micro-step (or other micro-flameholder) can extend laterally across the radially outer wall 34 for the entire lateral extent of the combustor, or a substantial portion thereof (e.g., 80% or more).

As depicted, the micro-flameholders 32 are configured as micro-ramps that are relatively flush with the wall 34 at an upstream end, and extend progressively farther away from the wall (i.e., progressively farther into an adjacent flow) at progressively more downstream locations on the micro-flameholders 32, then terminate in a relatively bluff downstream end. In other embodiments, other geometries can be used, including micro-vanes, micro-rods, micro-gutters (e.g., with "V" profiles), micro-steps, micro-cavities recessed into the wall 34, and so on.

In some embodiments, as also noted above, arrays of micro-flameholders can be arranged in different patterns than the pattern illustrated in FIG. 1A. As illustrated in FIG. 1B, for example, in an alternative arrangement for the combustor 20, a non-collinear, staggered array 30a of micro-flameholders 32a (or, from an alternative perspective, a set of multiple independently collinear arrays that collectively form the array 30a) can be disposed along a flow path of the combustor 20 as an alternative (or in addition) to the array 30 (see FIG. 1A). As illustrated, the array 30a includes four micro-flameholders 32a arranged in a two-dimensional array extending over the radially outer wall 34 of the combustor 20 in the lateral and flow directions 36 and 38 (see FIG. 3A).

Figure 1C:
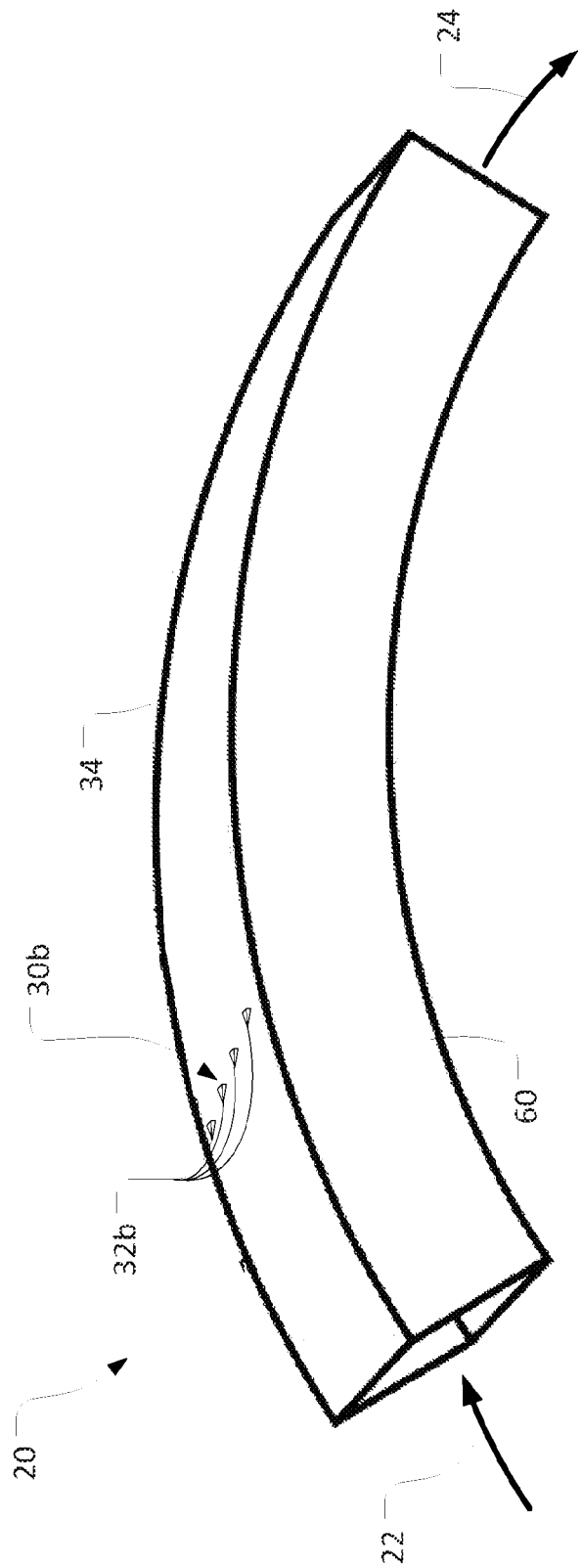
FIG. 1C is perspective schematic view of the combustor of FIG. 1A with a non-collinear arrangement of micro-flameholders, according to still another embodiment of the disclosure.

As another example, as illustrated in FIG. 1C, in another arrangement for the combustor 20, a collinear array 30b of micro-flameholders 32b can be disposed along a flow path of the combustor 20 as an alternative (or in addition) to the arrays 30 or 30a (see FIGS. 1A and 1B). As illustrated, the array 30b includes four micro-flameholders 32b arranged in a two-dimensional, generally collinear array that extends at an angle over the radially outer wall 34 of the combustor 20 in the lateral and flow directions 36 and 38 (see FIG. 3A). In other configurations, a similar array can angle in a different (e.g., opposite) direction than the array 30b, or can be configured with a non-linear (e.g., curved) collective profile (not shown).

Some discussion herein may focus in particular on the micro-flameholders 32 and the array 30 illustrated in particular in FIG. 1A. This focus is selected by way of example only. Unless otherwise limited, discussion of various aspects and options for the micro-flameholders 32 and the array 30 is generally intended also to apply to the micro-flameholders 32a and 32b and the arrays 30a and 30b, as well as to other micro-flameholders types and arrangements contemplated by the disclosure.

Generally, the micro-flameholders 32 (or the micro-flameholders 32a or 32b, or others) can be configured with non-catalytic materials, such that an ignition source may be needed to initiate combustion within the combustor 20. Any variety of ignition sources can be used, such as an electronic ignition source 42, as depicted in FIG. 2A. In some embodiments, however, catalytic materials can alternatively (or additionally) be used.

In some embodiments, it may be useful to scale the micro-flameholders 32 with respect to various characteristics of the flow of reactants and combustion products through the combustor 20. As depicted, in FIG. 2B, for example, it may be useful for the micro-flameholders 32 to extend away from the relevant wall 34 beyond the depth of a local boundary layer 28 of the flow. In other embodiments, however, other configurations can be used. For example, the micro-flameholders 32 can be configured to extend partly, but not entirely, through the boundary layer 28.

Generally, to provide effective flameholding, a micro-flameholder should protrude outward from a structure (e.g., a wall of the relevant combustor) on which it is supported, by a distance sufficient to trap hot combustion products on a downstream side of the micro-flameholder (e.g., relative to the flow direction 38 of FIG. 3A). For example, when a viscous boundary layer is present on the combustor wall (as is typically the case) then a micro-flameholder should generally protrude outward from the wall (i.e., along the second direction) by a distance equal to at least a substantial fraction (e.g., at least a quarter) of the local thickness of the boundary layer in order to provide effective flameholding. Micro-flameholders that protrude outward from the wall by smaller distances than this can still provide flameholding, but their flameholding can be intermittent and thus can be generally less effective than micro-flameholders that protrude by larger distances.

In some embodiments micro-flameholders can protrude outward from a relevant support structure (e.g., a wall of the relevant combustor) by distances comparable to the local boundary layer thickness, or by distances larger than the local boundary layer thickness (e.g., by two or three local boundary layer thicknesses). Generally, larger micro-flameholders can provide greater assurance of continual and effective flameholding, but can incur other performance detriments (e.g., as described above) if they are substantially larger than the minimum size needed to achieve continual and effective flameholding to appropriately support RT instabilities and the resulting RT-driven interpenetration and mixing.

Generally, in order to provide effective flameholding, the width of a micro-flameholder (e.g., along the lateral direction 36 of FIG. 3A) should also be large enough to trap sufficient hot combustion products on a downstream side of the micro-flameholder (e.g., relative to the flow direction 38 of FIG. 3A). In some embodiments the width of a micro-flameholder can be comparable to (e.g., within a factor two or three times larger or smaller than) the distance by which the micro-flameholder protrudes from the wall. Micro-flameholders that are excessively wide or narrow compared to their protrusion height can provide only intermittent flameholding and thus can be less effective for the flameholding needed to support RT instabilities and resulting RT-driven interpenetration and mixing.

Generally, in order to provide effective flameholding, the length of a micro-flameholder (e.g., along the flow direction 38 of FIG. 3A) should be large enough to trap sufficient hot combustion products on a downstream side of the micro-flameholder (e.g., relative to the flow direction 38 of FIG. 3A). In some embodiments the length of a micro-flameholder can be comparable to (e.g., within a factor two or three times larger or smaller than) the distance by which the micro-flameholder protrudes from the wall. Micro-flameholders with lengths that are excessively short compared to their protrusion height can be less effective at providing continual flameholding and thus can be less effective for facilitating or promoting RT instabilities and the resulting RT-driven interpenetration and mixing. Micro-flameholders that are excessively long compared to their protrusion height can result in unnecessarily long combustors with resulting detrimental effects.

As depicted in FIG. 3B, in order to appropriately enhance RT instabilities and mixing, the micro-flameholders 32 can be positioned with lateral (or other) separations 44 between adjacent micro-flameholders 32, as measured along the lateral (or other) direction 36, which is generally perpendicular to the bulk flow direction 38 and also generally perpendicular to the transverse direction 26. As depicted, the separations between the micro-flameholders 32 are generally regular separations, exhibiting a center-to-center spacing 46 that is substantially larger than a width 48 of the various micro-flameholders 32. However, it will be understood that this disclosure is not limited to the use of multiple micro-flameholders (e.g., as in the array 30 of the micro-flameholders 32), identically sized micro-flameholders, or uniform spacings (e.g., as in the center-to-center spacings 46 at the separations 44).

It will be further understood that one or more of the micro-flameholders 32 may be disposed at a variety of locations in (or near) the combustor 20, including locations other than those depicted in the various figures, so long as the positioning of the micro-flameholders 32 acts to promote appropriate RT instability within the combustor 20. In some embodiments, one or more of the micro-flameholders 32 can be disposed outside (e.g., upstream) of an area of the combustor 20 that is subject to transverse acceleration, with a region of product gases trapped by the one or more micro-flameholders 32 extending at least partly into the area subject to the acceleration. For example, one or more of the micro-flameholders 32 can be disposed just upstream of the curvilinear flow path of the combustor 20, such that combustion products trapped downstream of the one or more micro-flameholders 32 (e.g., products trapped in a region immediately downstream of the micro-flameholders 32) may be subject to transverse acceleration even if fluid may not be immediately subject to transverse acceleration at the interface between the fluid and with the micro-flameholders 32.

Referring also to FIG. 4, as the reactants flows over the micro-flameholders 32 during operation of the combustor 20, a region 50 of product gases can be generated in the immediate (generally downstream) proximity of each micro-flameholder 32 as a result of the conversion of the reactants into combustion products. Due to the disposition of the micro-flameholders 32 in the combustor 20, a lateral pattern of irregularities can be created in the interface between the region 50 and the surrounding reactants. Further, due to the curvature of the flow direction 38, transverse acceleration generally acts to force the less dense combustion products formed (or trapped) in the immediate proximity of the micro-flameholders 32 to flow away from the micro-flameholders 32 and the radially outmost wall 34. The transverse acceleration also acts to force the denser reactants to flow toward the micro-flameholders 32 and the radially outmost wall 34, as well as into the separations 44 between adjacent micro-flameholders 32 (see, e.g., FIGS. 3A, 3B, and 4). With appropriate spacing of the micro-flameholders 32 (e.g., with the spacing 46), the above-noted pattern of irregularities may be created in such a way that above-noted RT instability induces amplification of the pattern to provide relatively rapid interpenetration and associated mixing between the hot combustion products and the reactants within the combustor 20.

As noted above, the spacing 46 between micro-flameholders can be represented as a spacing, S, which can be equated with a dominant wavelength, $\lambda$, in order to optimize RT instability according to the RT amplification rate equation, $\beta = \mathrm{SQRT}\{2 \cdot \pi \cdot a \cdot A/\lambda\}$. Further, the thickness of the interface between the region 50 and the surrounding reactants can generally correspond to the thickness, $\delta$. Accordingly, in keeping with the discussion above, it can be useful to select the spacing 46 to be approximately equal to the thickness between the region 50 and the surrounding reactants. This can be seen, for example, with reference to FIG. 5, which illustrates the dependence between dimensionless amplification rate (i.e., $\beta$, as a function of dimensionless wavelength, $\lambda/\delta$, divided by a nominal $\beta$ with $\lambda$ equal to $\delta$) and the ratio of $\lambda/\delta$. The plot in FIG. 5 illustrates that RT instability can be maximally amplified by establishing a spacing 46, and therefore a dominant wavelength, $\lambda$, that is approximately equal to the thickness, $\delta$, between the region 50 and the surrounding reactants.

Figure 5:
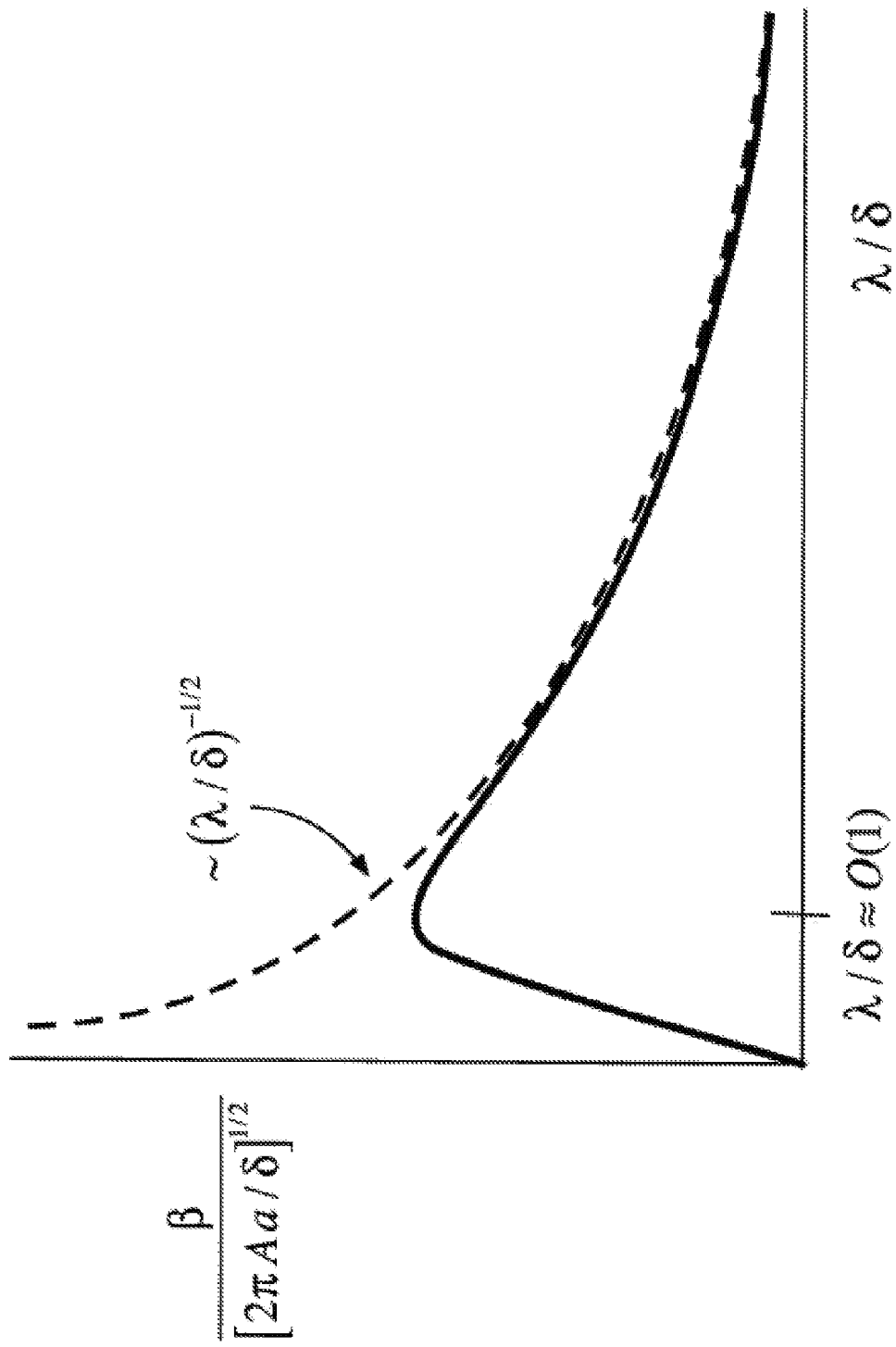
FIG. 5 is a graphical depiction of a dependence of a dimensionless Rayleigh-Taylor amplification rate on a dimensionless wavelength factor.

As also illustrated in FIG. 5, for wavelengths, $\lambda$, (and spacings 46) that are substantially smaller than the thickness, $\delta$, the effect of thermal and mass diffusion between the reactants and the combustion products can cause a decrease in the amplification rate $\beta$ with continued reduction in the wavelength $\lambda$. Likewise, wavelengths, $\lambda$, (and spacings 46) that are substantially larger than the thickness, $\delta$, can also result in a decrease in the amplification rate $\beta$. However, significant amplification rates, $\beta$, can still be achieved with spacings 46 between the micro-flameholders 32 that correspond to dominant wavelengths, $\lambda$, that are substantially different from the optimal value (i.e., a value of $\lambda$ approximately equal to the thickness, $\delta$). In this regard, as illustrated in FIG. 5, wavelengths, $\lambda$, (and spacings 46) longer than the optimal value may be generally preferable to those that are shorter than the optimal value. However, a variety of suitable spacing 46 between the micro-flameholders 32, including spacings 46 that are smaller than the thickness, $\delta$, can provide for the beneficial RT amplification of the pattern of irregularities in the interface between the region 50 and the surrounding reactants.

In this manner, the micro-flameholders 32 may be positioned within the combustor 20 so that, upon the combustion of the higher-density reactants into the lower-density combustion products, the micro-flameholders 32 can facilitate or promote enhanced interpenetration via RT instability of the combustion products into the reactants and of the reactants into the combustion products. Such interpenetration of the product gases and the reactants can thus be accomplished through exploitation of RT instability and RT-driven turbulence, without necessarily requiring conventional macro-scale aerodynamic flameholder designs to promote interpenetration and associated mixing based on the interaction between the flow entering the combustor 20 and the detailed internal geometry of the combustor 20. Or, such interpenetration can be achieved in conjunction with conventional macro-scale aerodynamic flameholder designs to attain more desirable combustor performance, including operation of the combustors over a wider range of conditions than would otherwise be practical or with smaller, less dense, and less expensive combustor geometries. Further, through exploitation of RT instability and RT-driven turbulence, mixing may be accomplished for a broad range of operational fluid flow rates through the combustor 20, including fluid flow rates at (and between) idle operation of the combustor 20 and maximized reactant flow rates into the combustor 20.

In some embodiments, the use of micro-flameholders can provide particular benefits over the use of other features (e.g., macro-scale flameholders or catalytic elements) within the combustor 20. For example, owing to their relatively small size, the micro-flameholders 32 can achieve improved flameholding due to the more continuous nature of RT-induced mixing. This can stand in contrast, for example, to the use of intermittent separation and shedding of vortical structures in conventional combustion arrangements, which can result in flameout if interrupted for sufficient time. Further, the use of the relatively small micro-flameholders, in contrast to larger conventional flameholders or catalytic elements, can provide significantly reduced pressure losses resulting in corresponding improvements to overall system efficiency, including due to the potentially reduced pressure losses of RT-induced mixing, in contrast to the large-vortex mixing of conventional systems.

As noted above, the disclosed system and method can be used in a variety of combustion systems, with the combustor 20, the micro-flameholders 32, and related features and dimensions of the various figures presented as examples only. For example, alternative embodiments of the combustor 20 (or other combustors) can be configured without a radially inner wall 60 (see, e.g., FIGS. 1A, 2A, and 4) or other walls, such that the reactants and combustion products flow through a partially open channel (or other open conduit) rather than an enclosed duct. Further, in different embodiments, the disclosed system and method can be used with rotating or non-rotating combustors, including, as non-limiting examples, continuous-combustion systems configured as rotary ramjets, wave-driven rotors, stationary gas turbine engines (e.g., for electric power generation), inter-turbine burners (e.g., for gas-turbine engines), gas turbine engines for aircraft propulsion via turbojet, turbofan, turboprop and other configurations, gas turbine engines that provide shaft power generation for large ship propulsion and other applications requiring shaft power, high-speed aero-propulsion systems for applications such as ramjets and scramjets, utility power generation systems based on coal or natural gas fired boilers, distributed power generation systems for prime or peaking applications, high-value industrial burners and furnaces for metals, plastics, ceramics, petrochemicals, and numerous other processes, alternative energy systems fueled on low heating-value gases from biomass, landfills, or other sources, waste and hazardous materials incineration processes based on high-temperature combustion systems, and so on.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A method for combusting reactants including fuel and oxidizer into combustion products in a combustor, the method comprising:
   providing an engine having the combustor configured to contain a flow of the reactants and the combustion products that extends in a first direction, the flow being subject to acceleration in a second direction at least partly transverse to the first direction; and
   disposing one or more micro-flameholders within the combustor one or more of:
      at one or more locations at which the flow is subject to the acceleration in the second direction; and
      upstream of the one or more locations at which the flow is subject to the acceleration in the second direction;
   the one or more micro-flameholders being formed as one or more non-catalytic flameholders and configured to one or more of facilitate and promote Rayleigh-Taylor instability and Rayleigh-Taylor-driven turbulence to cause interpenetration of the reactants and the combustion products within the combustor.

2. The method of claim 1, wherein the one or more micro-flameholders are disposed at least partly along an at least partly curvilinear flow path for the flow.

3. The method of claim 2, wherein the one or more micro-flameholders are disposed along a radially outermost interior surface of the combustor that at least partly defines the at least partly curvilinear flow path.

4. The method of claim 1, wherein the acceleration of the flow is at least partly a centripetal acceleration.

5. The method of claim 4, further comprising:
   causing the combustor to rotate, wherein the centripetal acceleration of the flow is at least partly caused by the rotation of the combustor.

6. The method of claim 1, wherein the one or more micro-flameholders are included in an array of micro-flameholders, the array including a first micro-flameholder separated from a second micro-flameholder by a first flameholder spacing along a third direction at least partly transverse to the first and second directions.

7. The method of claim 6, wherein the first flameholder spacing is a center-to-center spacing between the first and second micro-flameholders.

8. The method of claim 6, wherein the first flameholder spacing is within 10% of a thickness of an interface between the reactants and the combustion products.

9. The method of claim 1, wherein the one or more micro-flameholders extend at least partly in the second direction away from an interior surface of the combustor.

10. A system for combusting reactants including fuel and oxidizer into combustion products, the system comprising:
    a combustor configured to contain a flow of the reactants and the combustion products that extends in a first direction, the flow being subject to acceleration in a second direction at least partly transverse to the first direction; and
    one or more micro-flameholders that are disposed within the combustor one or more of:
       at one or more locations at which the flow is subject to the acceleration in the second direction; and
       upstream of the one or more locations at which the flow is subject to the acceleration in the second direction;
    the one or more micro-flameholders being formed as one or more non-catalytic flameholders that are configured to cause interpenetration of the reactants and the combustion products within the combustor via Rayleigh-Taylor instability and Rayleigh-Taylor-driven turbulence.

11. The system of claim 10, wherein the one or more micro-flameholders are disposed at least partly along an at least partly curvilinear flow path for the flow.

12. The system of claim 11, wherein the one or more micro-flameholders are disposed along an interior surface of the combustor that at least partly defines the at least partly curvilinear flow path.

13. The system of claim 10, wherein the acceleration of the flow is at least partly a centripetal acceleration.

14. The system of claim 13, wherein the combustor is configured to rotate during operation; and
    wherein the centripetal acceleration of the flow is at least partly caused by the rotation of the combustor.

15. The system of claim 10, wherein the one or more micro-flameholders are included in an array of micro-flameholders, the array including a first micro-flameholder separated from a second micro-flameholder by a first flameholder spacing along a third direction at least partly transverse to the first and second directions.

16. The system of claim 15, wherein the first flameholder spacing is a center-to-center spacing between the first and second micro-flameholders.

17. The system of claim 10, wherein the one or more micro-flameholders include a single micro-flameholder extending between 50% and 100% of a width of the single micro-flameholder, in a third direction at least partly transverse to the first and second direction, of at least one of the combustor and a feature of the combustor configured to contain the flow during the acceleration in the second direction.

18. The system of claim 17, wherein the single micro-flameholder includes at least one of a micro-step and a micro-cavity.

19. A system for combusting reactants including fuel and oxidizer into combustion products in a combustor of an engine that operates on an intermittent-combustion principle, the system comprising:

a combustor configured to contain the reactants and the combustion products as the combustor moves in a first direction, with the combustor being further configured for the reactants and the combustion products to flow within the combustor as the combustor moves in the first direction, and with the motion of the combustor in the first direction inducing acceleration in a second direction for the flow of the reactants and the combustion products, the second direction being at least partly transverse to the first direction; and one or more micro-flameholders that are formed as one or more non-catalytic flameholders and are disposed within the combustor one or more of:

at one or more locations at which the flow of the reactants and the combustion products is subject to the acceleration in the second direction; and upstream of the one or more locations at which the flow of the reactants and the combustion products is subject to the acceleration in the second direction;

the one or more micro-flameholders being configured to one or more of facilitate and promote Rayleigh-Taylor instability and Rayleigh-Taylor-driven turbulence to cause interpenetration and mixing of the reactants and the combustion products within the moving combustor.

* * * * *